United States Patent Office 3,436,728
Patented Apr. 1, 1969

3,436,728
VEHICLE LIGHT AND HORN SIGNALLING
CONTROL SYSTEM
Philip J. Silverwood, New Gambier Road, Mount Vernon,
Ohio 43050, and Foryst J. Winship, Columbus, Ohio
(100 Tree Top Court, Timonium, Md. 21093)
Filed Oct. 22, 1965, Ser. No. 501,170
Int. Cl. B60q 1/52; G08b 7/06
U.S. Cl. 340—75
8 Claims

ABSTRACT OF THE DISCLOSURE

A visual signaling system for automotive vehicles for warning operators of other vehicles of proximate dangers is provided which utilizes the vehicle's illumination system comprising the headlights and the rear warning lights. This system provides an electrical circuit interconnected between the horn signaling system and the vehicle's illumination system with the system energized through actuation of the horn signaling system. The electrical circuit is interconnected to permit operation of the signaling system irrespective of the status of the circuit normally controlling the operation of the vehicle's illumination system and thus permits the vehicle operator to visually signal other vehicle operators through actuation only of the vehicle's horn signaling system.

*General description of the prior art*

Signaling systems have been devised and installed in vehicles, particularly of the automobile type, to provide some means of indicating to other vehicle operators of their approach to obstructions or other dangerous situations. It is well known that all automobiles are presently required to be equipped with the conventional aural signaling or warning device. Such as aural warning device, however, has substantially limited effectiveness in present-day traffic situations involving relatively high speeds and greater stopping distances. The usual aural warning device or horn installed in motor vehicles has a relatively limited range and would most likely not be heard by the operators of oncoming vehicles or those at any substantial distance or traveling at high speeds. In addition, the signal provided by the customary horn is generally considered as a warning of the approach of the particular vehicle giving the aural warning signal and not as an advisory to other vehicle operators of their approach to an obstruction or other dangerous situation which does not include the vehicle giving the signal. Accordingly, it has been proposed to utilize the customary illuminating devices carried by a vehicle to provide a visual signal by which it is intended to advise other vehicle operators of their approach to such obstructions or dangerous situations. To accomplish this objective, signaling systems of the prior art, such as are known, have generally comprised modifications to the existing electrical circuitry of the vehicle which control the operation of the illuminating devices provided. As such, these modified circuits have included switching means connected in circuit with the illuminating devices to permit selective energization of the illuminating devices. In addition to the usual energization of a circuit to the illuminating devices, the prior art circuit modifications have also provided means for overriding the usual control circuitry. A disadvantage of merely modifying the existing circuitry by the inclusion of a manually operable switching mechanism is that this further complicates operation of the vehicle in that the operator is then required to operate a second or additional mechanism to effect the signaling operation. This further complicates complex driving situations in that it is an additional distraction to the vehcle operator. Such a prior art signaling system is exemplified in the disclosure of Patent No. 2,655,642 issued to R. J. Ayres et al. on Oct. 13, 1953. This patent discloses the utilization of an auxiliary switching mechanism which is seelctively actuated by the vehicle operator to initiate the signaling operation. Also included in the modified circuitry of this prior art device is circuit means for alternately and repetitively illuminating the illumination devices on ther ight and left sides of the vehicle. This alternate illumination scheme leaves the alternate sides of the vehicle unilluminated for brief intervals of time and is, therefore, an inherent safety hazard during night operation.

It is, therefore, the primary objective of this invention to provide a signaling system for a vehicle which provides a visual warning signal by means of illumination devices provided on the vehicle and which is actuated by the control means for the aural warning device thereby minimizing the control functions required of the vehicle operator to effect the visual signaling operation.

It is another important object of this invention to provide a visual signaling system for a vehicle which utilizes the illumination devices with which a vehicle is normally provided and is operative to alternately and repetitively energize the high and low intensity illumination elements of the illumination devices.

It is a further object of this invention to provide a visual warning system for a vehicle which may be readily incorporated in the existing electrical control circuitry of the vehicle to provide the desired control operation.

It is also an object of this invention to provide a visual signaling system for a vehicle comprising a relatively simple circuit which may be readily incorporated in existing vehicle electrical circuitry and which may be economcally assembled and manufactured, and which is capable of providing reliable operation.

These and other objects and advantages of this invention will be readily apparent from the following detailed description of embodiments of this invention and the accompanying drawings.

Figure 1:
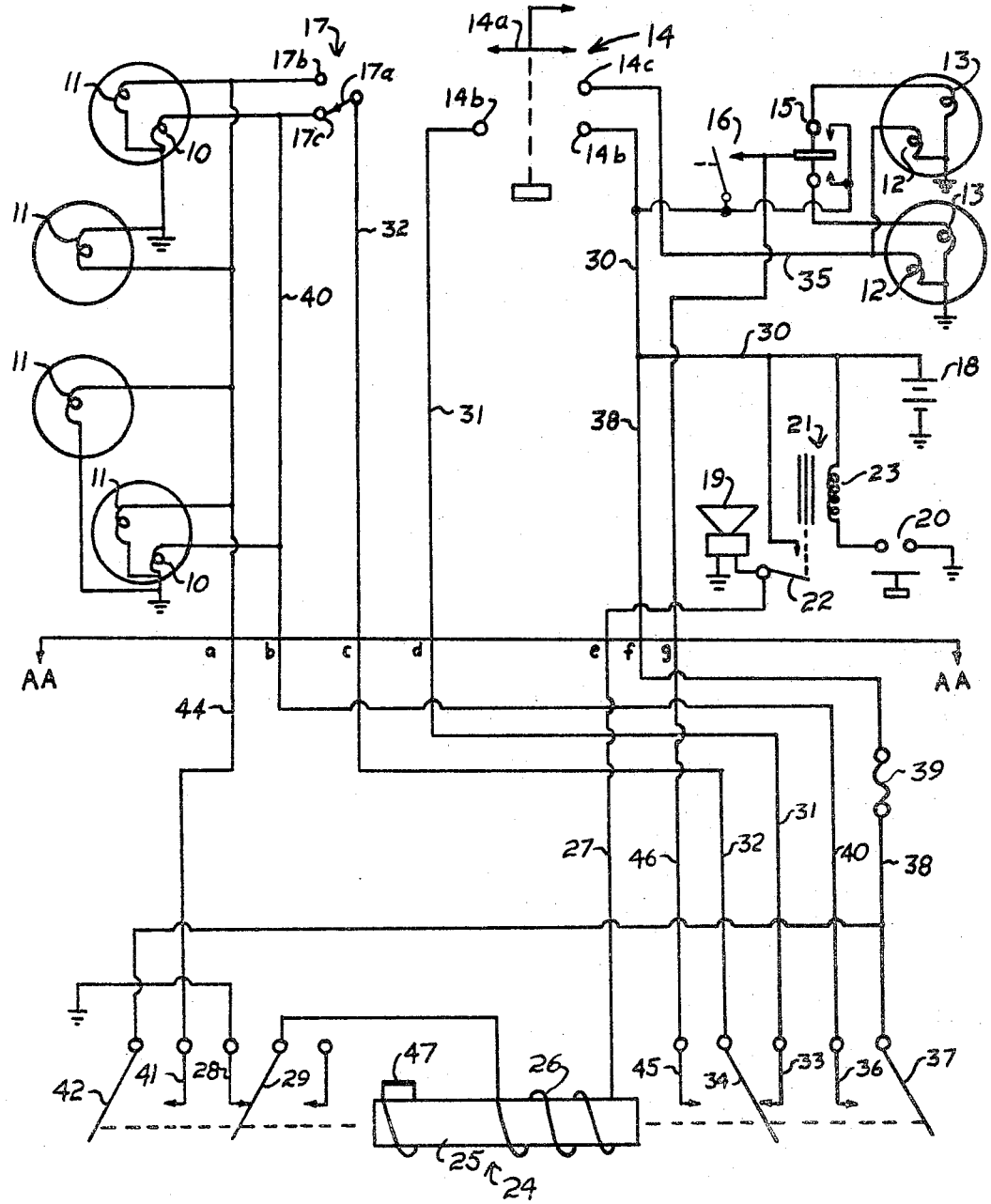
FIGURE 1 is a schematic circuit diagram of an electrical circuit for a vehicle embodying the principles of this invention.

Having reference to FIGURE 1, an embodiment of the invention is shown incorporated in the existing circuitry and elements with which a vehicle is normally provided. These conventional circuit elements include the usual dual-beam type headlight installation which form the forwardly-directed illumination means and the warning illuminating means installed at the rear of the vehicle. A dual headlight installation is illustrated as this type is now installed in most vehicles. Such a dual headlight installation typically includes a low-intensity, electrical illumination element 10 mounted at each side of the vehicle and a pair of high-intensity illumination elements 11 also mounted at each side of the vehicle. As indicated, one of the high-intensity elements is usually mounted in a sealed enclosure with a respective one of the low-intensity elements while the second associated high-intensity element is mounted in a separate enclosure and which is supported in close proximity to that enclosure containing the low-intensity element. The illuminable warning devices or tail light assemblies mounted at the rear of the vehicle may also be of the dual element type and include an illumination element 12 which is commonly referred to as the parking beam and a stop or brake light element 13. A parking beam element 12 and a stop or brake light element 13 may be mounted within a single enclosure positioned at a respective side of the vehicle or each element may be contained in a separate enclosure. Control of the several illuminating elements is effected by means of a conventional lighting switch 14, a direction-signaling switch 15 and a brake-actuated switch 16. Also included in the conventional circuitry is a foot-operated dimmer switch 17 which effects control and energization of the selected high or low intensity elements of the headlights. As will be noted by reference to FIGURE 1, the directional signaling switch 15 and the brake-actuated switch 16 are only diagrammatically indicated and are not further described herein as they comprise well known components and associated circuitry and their respective operations are not affected or otherwise modified by the signaling system and circuitry of this invention.

An electrical power supply or source comprising a battery 18 provides the necessary electrical power for operation of the illumination devices and other equipment or devices which may be included in the electrical circuitry of the vehicle.

An automotive vehicle is also provided with an aural signaling or warning device such as the well known horn structure 19. Operation of the horn 19 is conventionally controlled by a switch mechanism 20 which is carried on the steering wheel for convenience and ready access by the vehicle operator. The switch mechanism 20 is of the normally open, pushbutton type and, as a consequence of its construction and installation, has a relatively low electrical power rating. Thus, the aural warning system also includes a remote power switch 21 which is operative to connect the horn 19 in circuit with the power source 18 and is controlled by the switch mechanism 20. Such a remote power switch 21 may comprise a conventional relay structure incorporating a single, normally open, set of contacts 22 which may be closed upon energization of an electromagnetic structure 23. The electromagnetic structure 23 is connected in circuit with the switching mechanism 20 carried on the steering wheel and this switching mechanism will, therefore, be effective in controlling the operation of the horn.

The lighting switch 14 is also of conventional construction as is mounted on the dashboard of an automotive vehicle and is of a three-position type. The three positions of such a switch are "Off," where none of the illuminating devices are energized other than in response to the directional signaling switch 15 or the brake-actuated switch 16; a second position wherein the parking lights at the front end of the vehicle (not shown) and at the rear of the vehicle are energized; and a third position in which the forwardly directed illumination devices are energized as selectively determined by the dimmer switch 17 and the parking beam elements 12 of the tail lamps will also be illuminated. Only the "Off" and third positions of the lighting switch 14 are of particular consequence in connection with the explanation of this invention and, therefore, only these positions are shown in FIGURE 1. The lighting switch 14 is shown positioned in the "Off" position with the three terminals 14b and 14c being shown as open-circuited. In the third position, the three terminals illustrated will be interconnected by a movable member 14a to form the necessary completed circuits to the several elements of this electrical circuit.

The foot dimmer switch 17 is also of conventional construction and includes the two output terminals 17b and 17c which are selectively connected in circuit by the movable contact 17a to complete circuits to the respective high and low intensity elements of the headlights.

Providing the automatic control of the illumination devices of the vehicle to obtain the desired visual signaling is an electromagnetic structure 24 having several sets of contacts which are connected in circuit with the several elements previously described. This relay structure 24 comprises a magnetizable core assembly 25 on which an energizing coil 26 is mounted. One terminal of the coil 26 is connected by a lead 27 to the normally open set of contacts 22 so as to be connected to the battery 18 when the horn is in operation. The opposite terminal of the coil 26 is connected to ground through the normally closed stationary contact 28 and movable contact 29. The contact 29 is controlled through magnetization of the core assembly 25.

A circuit for energization of the headlights is normally completed from the battery 18 through the terminals of the lighting switch 14 by the leads 30, 31 and 32. When the switch 14 is in the third position, a circuit is completed by means of the movable member 14a interconnecting the contact terminals 14b. Also included in this circuit and connected between the leads 31 and 32 is a normally closed set of contacts formed by the stationary contact 33 and a movable contact 34 which is controlled by energization of the relay core 25. The opposite end of the lead 32 is connected to the input terminal of the dimmer switch 17 and is connected to a movable contact 17a which is adapted to selectively engage either a terminal 17b or a terminal 17c associated with the respective high and low intensity illumination elements of the headlights. The movable member 14a of the lighting switch is also adapted to engage a contact terminal 14c to which a lead 35 is attached for connecting the parking beam elements 12 into the circuit.

With the electromagnetic relay structure 24 deenergized, as indicated in FIGURE 1, the electrical illuminating circuitry will be operable in a conventional manner to obtain the desired energization of the specific illuminating elements. With the lighting switch 14 placed in the "Off" position as illustrated, the brake-actuated switch 16 and the directional signaling switch 15 will remain effective in energizing the stop or brake illumination elements 13 of the circuit. As is well known, placing the lighting switch 14 in a second or parking light position would merely modify the circuit to illuminate the parking beam elements 12 of the tail light assembly and the parking lights (not shown) mounted at the front end of the vehicle. Placing the lighting switch 14 in the third position results in energization of the forwardly directed headlight elements as determined by the position of the dimmer switch 17. Depending on the position in which the movable member 17a of the dimmer switch, either the low-intensity elements 10 or the high-intensity elements 11 will be connected in circuit with the battery 18. This conventional operation of the electrical illumination elements is not effected by electromagnetic relay structure 24 when the contacts 33 and 34 are normally closed and complete the necessary circuitry.

Also included in the electromagnetic relay structure 24 is a third set of contacts which are of the normally open type comprising a stationary contact 36 and a movable contact 37 which is actuated by the core assembly 25. The movable contact 37 is connected to the battery 18 through the lead 30 and a lead 38 having a fuse 39 interposed therein. The stationary contact 36 is connected by a lead 40 to the terminal 17c of the dimmer switch which is associated with the low-intensity illumination elements 10. A fourth set of contacts controlled by the electromagnetic relay structure are the normally open set of contacts formed by the stationary contact 41 and the movable contact 42. The movable contact 42 of this set of contacts is connected to the battery 18 through the leads 30, 38 and a lead 43. A lead 44 attached to the stationary contact 41 connects with the terminal 17b of the dimmer switch associated with the high-intensity illumination elements 11 of the headlights.

Also included in the electromagnetic relay structure 24 is a fifth stationary contact 45 which cooperates with the movable contact 34 to form a normally open set of contacts. The stationary contact 45 is connected by a lead 46 to the stop or brake light elements 13 of the tail lamp assemblies through the direction signaling switch 15.

The electromagnetic relay structure 24 includes a second coil 47 which is also mounted on the magnetizable core assembly 25. The coil 47 comprises a single, short-circuited turn or conductor which is positioned closely adjacent one end of the core 25. The effect of the short-circuited coil 47 is to delay the operation of the movable contacts 29 and 42 relative to the operation of the movable contacts 34 and 37. Contacts 34 and 37 are positioned adjacent the end of the core 25 which is not affected by the positioning of the short-circuited coil 47 thereon and are instantaneously acting.

Operation of the visual signaling system of this invention is initiated by actuation or closing of the switching mechanism 20. As previously described, switching mechanism 20 is incorporated in an electrical circuit controlling operation of the aural warning device which comprises the horn 19. The horn switch 20 which is the most logical device for the vehicle operator to utilize in providing warning signals actuates the remote power switch 21 resulting in closing of the normally open set of contacts 22. This completes a circuit from the battery 18 to the horn 19. In addition, the contacts 22 complete a circuit through the lead 27 to the coil 26 of the electromagnetic relay structure 24. An electrical current will, therefore, flow through the coil 26 as the set of contacts formed by contacts 28 and 29 will be closed and complete a circuit to the ground and return to the battery 18. Thus, the coil 26 will energize the core assembly 25 and result in actuation of the movable contacts 34 and 37. Contacts 34 and 37 will be actuated substantially simultaneously with the operation of the horn 19 and a circuit will be completed through contacts 36 and 37 to terminals 17 of the foot dimmer switch. Assuming that the lighting switch 14 is in the illustrated "Off" position, it will be seen that an electrical circuit is completed from the battery 18 through the contacts 36 and 37 to the low-intensity illumination elements 10 of each of the respective headlights and these elements will be energized. It will also be noted that, with the dimmer switch 17 having its movable member 17a in engagement with terminal 17c, a circuit will be completed to the stop or brake light elements 13 of the tail light assemblies through the leads 32 and 46 and contacts 34 and 45 which will now be closed and result in energization of these elements. Should the dinner switch 17 have been in the position where the movable contact 17a engaged the high beam contact 17b, the brake light elements 13 would not have been energized at this point. At this point, should the horn switch 20 be released, the remote power switch 21 for the horn 19 will be deenergized and the contacts 22 will open. On opening of the contacts 22, the coil 26 of the electromagnetic relay structure 24 will be deenergized and the movable contacts 34 and 37 will return to their initial position. Nothing further will occur in the circuit until the horn switch is again actuated to complete a circuit and energize the horn.

However, should the horn switch 20 be maintained in a closed position for an interval of time greater than the delay time of the relay structure 24, the circuit of this invention will operate to provide an alternate and repetitive energization of the low and high intensity elements 10 and 11 of the headlights as well as intermittent energization of the stop or brake light elements 13. Returning to the point previously described where the low-intensity element 10 had been energized and the movable contacts 34 and 37 of the electromagnetic relay structure 24 had been actuated to complete circuits through the respective stationary contacts 45 and 36, it will be assumed that the horn switch 20 will be maintained in the closed position to continue energization of the horn circuit and maintaining of the contacts 22 in a closed position. After elapse of the delay time interval from initial energization of the coil 26, the movable contacts 29 and 42 will be actuated to open the circuit formed by the contacts 28 and 29 and to complete a circuit through contacts 41 and 42 which will now be closed. This time interval is determined by the particular construction of the electromagnetic relay structure 24 and specifically the shortcircuited coil 47 and the relay structure 24 will be appropriately designed for a specific application. Closing of contacts 41 and 42 to complete a circuit to the battery 18 through the leads 44, 43, 38 and 30 will energize the high-intensity illumination elements 11 of the headlights. Simultaneously, opening of contacts 28 and 29 will interrupt the circuit through the coil 26 and initiate deenergization of the core assembly 25. As the core 25 is deenergized, contacts 34 and 37 will return almost instantaneously to their normal position, as shown in FIGURE 1, and open the circuit through lead 40 to the low-intensity illumination elements 10 and open the circuit through lead 46 to the stop or brake light illumination elements 13.

The circuit will only momentarily remain in this configuration with the high-intensity illumination elements 11 energized as the contacts 29 and 42 will also return to their normal positions, as illustrated in FIGURE 1. The return of these contacts to their respective normal positions will be delayed from that of contacts 34 and 37 due to the time delay introduced by the short-circuited coil 47.

Upon return of the circuit to its original configuration, with contacts 28 and 29 closed, as shown in FIGURE 1, the cycle will again repeat itself for as long as the horn switch 20 is maintained in a closed position. Closing of contacts 28 and 29 will again permit energization of the core assembly 25 as a result of completing a circuit through the coil 26 and thereby initiate operation of the circuit. Thus, it will be seen that the high and low intensity illumination elements 10 and 11 will be alternately and repetitively energized to provide a distinctive blinking-type visual signal. Also, with this specific circuit arrangement, the stop or brake light illumination elements 13 will also provide a distinctive blinking visual signal. This signal, as provided by the brake lights 13, is not affected by the position of the dimmer switch 17 other than to the extent as to when the elements 13 will be initially energized. With the switch 17 in the position indicated, the brake lights 13 will be energized when the dimmer switch is in the low position and the low-intensity illumination elements 10 of the headlights are energized. Placing the dimmer switch 17 in the opposite position, the brake lights 13 will be energized simultaneously with the energization of the high-intensity illumination elements 11.

Placing of the lighting switch 14 in the second position where the parking beam elements 12 will be energized will not affect the operation of the circuit. The operation will be as described with the lighting switch 14 placed in the "Off" position as, in the second position, a circuit is completed from the battery 18 to only the parking beam elements 12 which do not form a part of the circuit of this invention.

With the lighting switch 14 placed in the third position, as where it is desired to utilize the headlights, a circuit would normally be completed from the battery 18 through the switch contacts 14b and 14a to the dimmer switch 17 and to the selected elements of the headlights. This normal operation of the lighting system has been previously described herein. Operation of the circuit to provide a visual signal will follow the same sequence as has been described in conjunction with the lighting switch 14 in the "Off" position with the only difference being in the point of initiation. Assuming that the switch 14 has been placed in this third position and that the horn switch 20 has been closed, a circuit will again be completed through the contacts 22 to energize the coil 26 of the electromagnetic relay structure 24. The headlights which were previously energized through the connection formed by the leads 30, 31 and 32 and the normally closed contacts 33 and 34 will now be replaced and overridden by a circuit completed through the contacts 36 and 37 and the leads 38 and 40. The battery 18 will now be seen to be connected to the low beam terminal 17c of the dimmer switch 17 and thus energize the low-intensity illumination elements 10 of the headlights. Even though the dimmer switch 17 may have been placed in the position where the high-intensity elements 11 were energized, the low-intensity elements 10 will now be energized. The operation of the circuit will proceed as previously described to alternately and repetitively energize the high and low intensity elements 11 and 10 of the headlights independently of the lighting switch. Simultaneously, the brake light elements 13 will also be repetitively energized to provide a visual, rearwardly-directed signal. The only other effect of the position of the dimmer switch 17 is in the timing of the energization of the brake light element 13 with respect to energization of either the high or low intensity elements 11 or 10 of the headlights.

The circuit of this invention provides a convenient and advantageous means of providing a readily distinguishable and distinctive visual warning signal through the utilization of the illuminating devices with which a vehicle may be provided. The operation of the circuit is initiated through actuation of a control device which is normally utilized by the vehicle operator in providing a warning signal. This comprises the switch 20 which normally actuates the horn 19 of the vehicle. Operation of the vehicle is, therefore, not further complicated when it is desired to provide a visual signal as it is only necessary to actuate a well known and often utilized device. The visual warning system is only operated when it is desired to maintain a continuous warning signal as by the horn 19. It will not be initiated other than to the extent of momentarily illuminating the low-intensity elements 10 of the headlights through momentary closing of the horn switch 20. Momentary closing of the horn switch 20 permits the operator to utilize the horn in a conventional manner in providing audible signals. However, should it be desired to provide an advantageous visual signal of continued duration in addition to the aural signal, it is only necessary to maintain the horn switch 20 in a closed position for the desired length of time and the high and low intensity illumination elements 11 and 10 will be alternately and repetitively energized to provide a distinctive blinking or flashing signal. In addition, the brake light elements 13 will also be alternately and repetitively energized to provide a similar rearwardly-directed visual signal.

The circuit of this invention does not affect the normal operation of the brake light elements 13 in response to the brake apparatus or the direction signal switch 15. A respective signal indicating the slowing up of the vehicle as a consequence of the application of the brakes or the direction of an intended turn as is required may be provided through operation of the respective switching devices 16 and 15. It will be readily seen by reference to the circuit of FIGURE 1, that operation of these safety signaling devices will override the visual signaling circuit of this invention.

Figure 2:
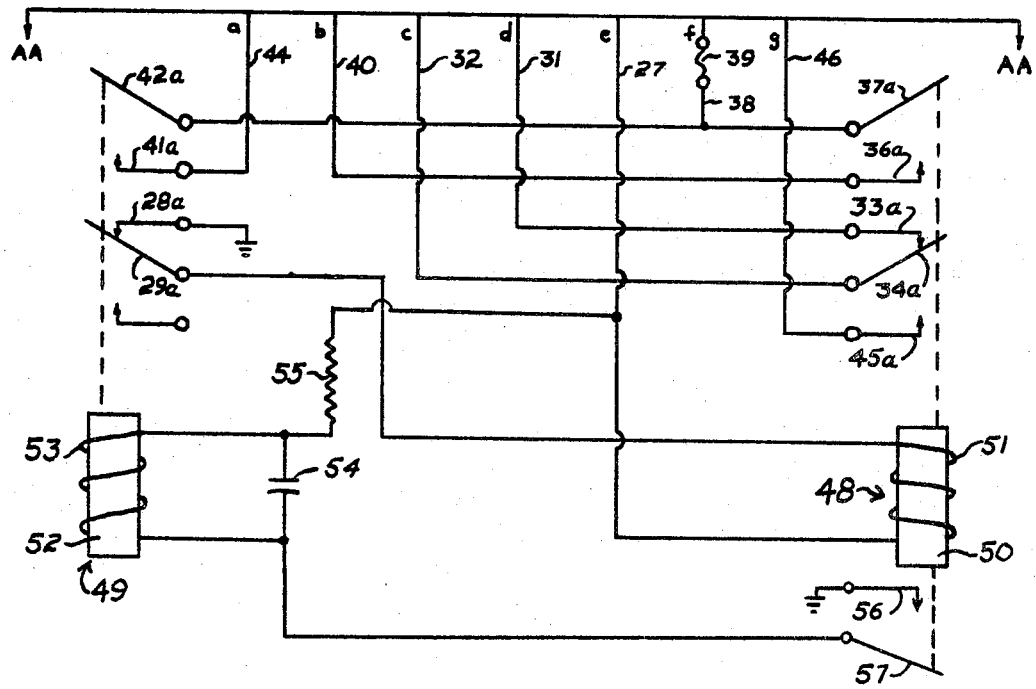
FIGURE 2 is a modified or alternate circuit configuration for that portion of the circuit in FIGURE 1 appearing below the line A—A.

The circuit modification shown in FIGURE 2 is designed to replace that portion of the circuit of FIGURE 1 which lies below lines A—A of that figure. The modified circuit operates in a manner similar to that previously described to provide the advantageous alternate and repetitive energization of the high and low intensity headlight elements. As can be seen by reference to FIGURE 2, this modified circuit includes similar sets of relay contacts which are similarly numbered with subscripts a. The electromagnetic coil assembly 25 and the coils 26 and 47, however, are replaced by two independently operable electromagnet structures 48 and 49. The electromagnetic structure 48 includes a core 50 and an energizing coil 51 and an additional set of normally open contacts which include the stationary contact 56 and the movable contact 57. The coil 51 is connected in the circuit in a similar manner to that of the coil 26 in the circuit shown in FIGURE 1. The electromagnetic structure 48 operates the contacts 34a and 37a and functions in a manner identical to that described in association with that portion of the electromagnetic structure shown at the right side of FIGURE 1.

Delayed operaion of the contacts 29a and 42a is effected by the electromagnetic structure 49 which includes a core 52 and energizing coil 53 and is determined by a time-delay circuit connected with the coil. This time-delay circuit comprises a capacitor 54 connected in parallel with the coil 53 and a resistor 55 connected in series with the capacitor and to line 38. The opposite terminals of the coil 53 and capacitor 55 are connected to the movable contact 57 which, when in engagement with the stationary contact 56, completes a circuit through the capacitor and coil.

The modified circuit shown in FIGURE 2 will operate in a manner similar to the circuit of FIGURE 1. Each of the similar sets of contacts are connected in circuit to perform the same operations and functions. In this circuit, a delay in operation of the movable contacts 29a and 42a associated with the electromagnetic relay structure 49 is effected through the time-delay circuit formed by the resistance 55 and capacitor 54. In its deenergized or inoperative state, this circuit does not provide a completed circuit as the contacts 56 and 57 are open. Energization of electromagnet 48 in the operational sequence will result in closing of the contacts 56 and 57 resulting in current flow through the resistance 55 and capacitor 54 and parallel connected inductive coil 53. Energization of electromagnet 49 will be delayed for a time interval as is required to charge the capacitor 54 to the pull-in voltage of the coil 53. This time-delay is determined primarily by the time constant of the resistance 55 and capacitor 54.

Subsequent to energization of electromagnet 49 to effect actuation of movable contact 29a, the circuit through the energizing coil 51 of electromagnetic relay 48 will be opened and the associated sets of contacts will return to their respective normal positions. Contacts 56 and 57 will open interrupting the circuit through the capacitor 54 and coil 53 from the battery 18 and the capacitor will then discharge through coil 53. This discharging operation will thus introduce a time-delay in deenergization of the electromagnet 49 to the point where the associated movable contacts 29a and 42a will be able to return to their respective normal positions and thus permit initiation of a successive cycle.

It will be readily apparent from the foregoing detailed description of the preferred embodiments of this invention that a novel and improved visual signaling system is provided for vehicles. The signaling system of this invention provides for the automatic alternate and repetitive illumination of headlamps as well as the tail lamp assembly to produce a distinctive visual blinking or flashing signal. The initiation of the visual signal is effected by actuation of the switching device incorporated in the aural warning system with which a vehicle is provided and is thus effected by a normal reaction on the part of the vehicle operator to enhance safety of operation.

Having thus described this invention, what is claimed is:

1. In an electrical system for a vehicle having an electrical power source, forwardly directed illumination means including high and low intensity electrical illumination elements, an electrically actuated aural warning device, and a control circuit connected between said power source and said illumination means and aural warning device and including first and second selectively operable switching devices for independently controlling operation of said illumination means and aural warning device, respectively: a visual signaling system comprising circuit means interconnected with said control circuit and between said second switching device and said illuminating means and being operative to alternately and repetitively energize the high and low intensity illumination elements in response to operation of said second switching device in effecting operation of said aural warning device and to override said control circuit in controlling said high and low illumination elements.

2. A signaling system for a vehicle comprising an electrical power source, forwardly directed illumination means including high and low intensity electrical illumination elements, an electrically actuated aural warning device, first circuit means interconnected between said power source and said illumination means and aural warning device and including first and second switch means for independently controlling said illumination means and aural warning device, respectively, and second circuit means interconnected with said first circuit means and between said second switch means and said illumination means and being operative to alternately and repetitively enregize the high and low intensity elements of said illumination means in response to operation of said second switch means in effecting operation of said aural warning device and to override said first circuit means in controlling said high and low illumination elements.

3. A signaling system for a vehicle comprising an electrical power source, forwardly directed illumination means including high and low intensity electrical illumination elements, an electrically actuated aural warning device, first circuit means interconnecting with said power source and said aural warning device for controlling the operation thereof and including selectively operable, normally-open switch means, and second circuit means interconnecting with said power source and said illumination means and first circuit means for selective energization of said illumination means, said second circuit means including switch means operative to independently and selectively energize either element of said illumination means and control means operative to alternately and repetitively energize said high and low intensity illumination elements in response to operation of said aural warning device independently of operation of said switch means in controlling said high and low intensity illumination elements.

4. A signaling system according to claim 3 wherein said control means comprises an actuating means having a normally open, instantaneously closing first set of contacts connected in circuit to complete a circuit to said low intensity illumination elements upon the closing of said contacts, a normally closed, instantaneous opening second set of contacts connected in circuit between said switch means and said illumination means to interrupt energization of said illumination means through said switch means, a normally open, delayed closing third set of contacts connected in circuit with said power source and said high intensity illumination elements to complete a circuit thereto upon closing, and a normally closed, delayed opening fourth set of contacts connected in circuit with said actuating means to periodically deenergize said actuating means.

5. A signaling system according to claim 4 wherein said actuating means comprises an electromagnetic relay structure having an energizing coil connected in circuit with said fourth set of contacts and a short circuited coil for delaying operation of said third and fourth sets of contacts.

6. A signaling system according to claim 4 wherein said actuating means comprises a first electromagnetic relay structure operatively connected with said first and second sets of contacts, a second electromagnetic relay structure operatively connected with said third and fourth sets of contacts, and circuit means connected with an energizing coil of said second relay structure to delay operation of the contacts thereof.

7. A signaling system according to claim 3 including rearwardly directed illumination means connected in circuit with said second circuit means for alternate and repetitive energization thereof simultaneously with energization of said forwardly directed illumination means.

8. A signaling system for a vehicle comprising an electrical power source, an electrically actuated aural warning device, first circuit means interconnecting with said power source and said aural warning device for controlling the operation thereof and including switch means selectively operable to connect said warning device to said power source for actuation thereof, forwardly directed illumination means including high and low intensity illumination elements, and second circuit means interconnecting with said power source and said illumination means and first circuit means, said second circuit means including control switch means operative to selectively energize either the high or low intensity element of said illumination means and control means operable independently of said control switch means to alternately and repetitively energize said high and low intensity illumination elements in response to operation of said first circuit switch means to actuate said aural warning device.

References Cited
UNITED STATES PATENTS 2,734,181  2/1956  Warneck _____ 340—75
2,787,778  4/1957  Mulrooney _____ 340—75

JOHN W. CALDWELL, *Primary Examiner.*

HAROLD L. PITTS, *Assistant Examiner.*

U.S. Cl. X.R.

340—76